US012532368B2

(12) United States Patent
Tan et al.

(10) Patent No.: US 12,532,368 B2
(45) Date of Patent: Jan. 20, 2026

(54) ULTRA-LOW POWER ACCURATE RANGING AND PC WAKE FOR WIRELESS DOCKING APPLICATIONS

(71) Applicant: DELL PRODUCTS L.P., Round Rock, TX (US)

(72) Inventors: Geroncio Ong Tan, Austin, TX (US); Danilo O. Tan, Austin, TX (US); Harpreet S. Narula, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 607 days.

(21) Appl. No.: 17/966,610

(22) Filed: Oct. 14, 2022

(65) Prior Publication Data
US 2024/0129973 A1   Apr. 18, 2024

(51) Int. Cl.
*H04W 76/15* (2018.01)
(52) U.S. Cl.
CPC .................................. *H04W 76/15* (2018.02)
(58) Field of Classification Search
CPC ............. H04W 76/15; H04W 52/0274; H04W 28/0221; H04W 52/0261; H04W 52/02
See application file for complete search history.

(56) References Cited

U.S. PATENT DOCUMENTS

| | | | |
|---|---|---|---|
| 10,548,084 B1 | 1/2020 | Venkateswaran et al. | |
| 2018/0084588 A1* | 3/2018 | Khoury | H04M 1/72412 |
| 2021/0405718 A1* | 12/2021 | Lagnado | G06F 13/385 |

* cited by examiner

*Primary Examiner* — Ayodeji O Ayotunde
(74) *Attorney, Agent, or Firm* — Larson Newman, LLP

(57) ABSTRACT

An information handling system includes a first wireless data communication interface powered by a first power rail, a processor powered by a second power rail, and a second wireless data communication interface powered by the second power rail. When the second power rail is powered off, the first power rail is powered on. The first wireless communication interface determines that the information handling system is within a predetermined distance from a wireless dock, and in response, establishes a first wireless data communication link with the wireless dock, and provides an indication to wake the processor and the second wireless data communication interface. In response to the indication, the information handling system powers on the second power rail, wakes the processor, and establishes a second wireless data communication link between the second wireless data communication interface and the wireless dock.

18 Claims, 3 Drawing Sheets

ULTRA-LOW POWER ACCURATE RANGING AND PC WAKE FOR WIRELESS DOCKING APPLICATIONS

FIELD OF THE DISCLOSURE

This disclosure generally relates to information handling systems, and more particularly relates to providing ultra-low power ranging and PC wake for wireless docking applications.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include a first wireless data communication interface powered by a first power rail, a processor powered by a second power rail, and a second wireless data communication interface powered by the second power rail. When the second power rail is powered off, the first power rail may be powered on. The first wireless communication interface may determine that the information handling system is within a predetermined distance from a wireless dock, and in response, may establish a first wireless data communication link with the wireless dock and provide an indication to wake the processor and the second wireless data communication interface. In response to the indication, the information handling system may power on the second power rail, wake the processor, and establish a second wireless data communication link between the second wireless data communication interface and the wireless dock.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
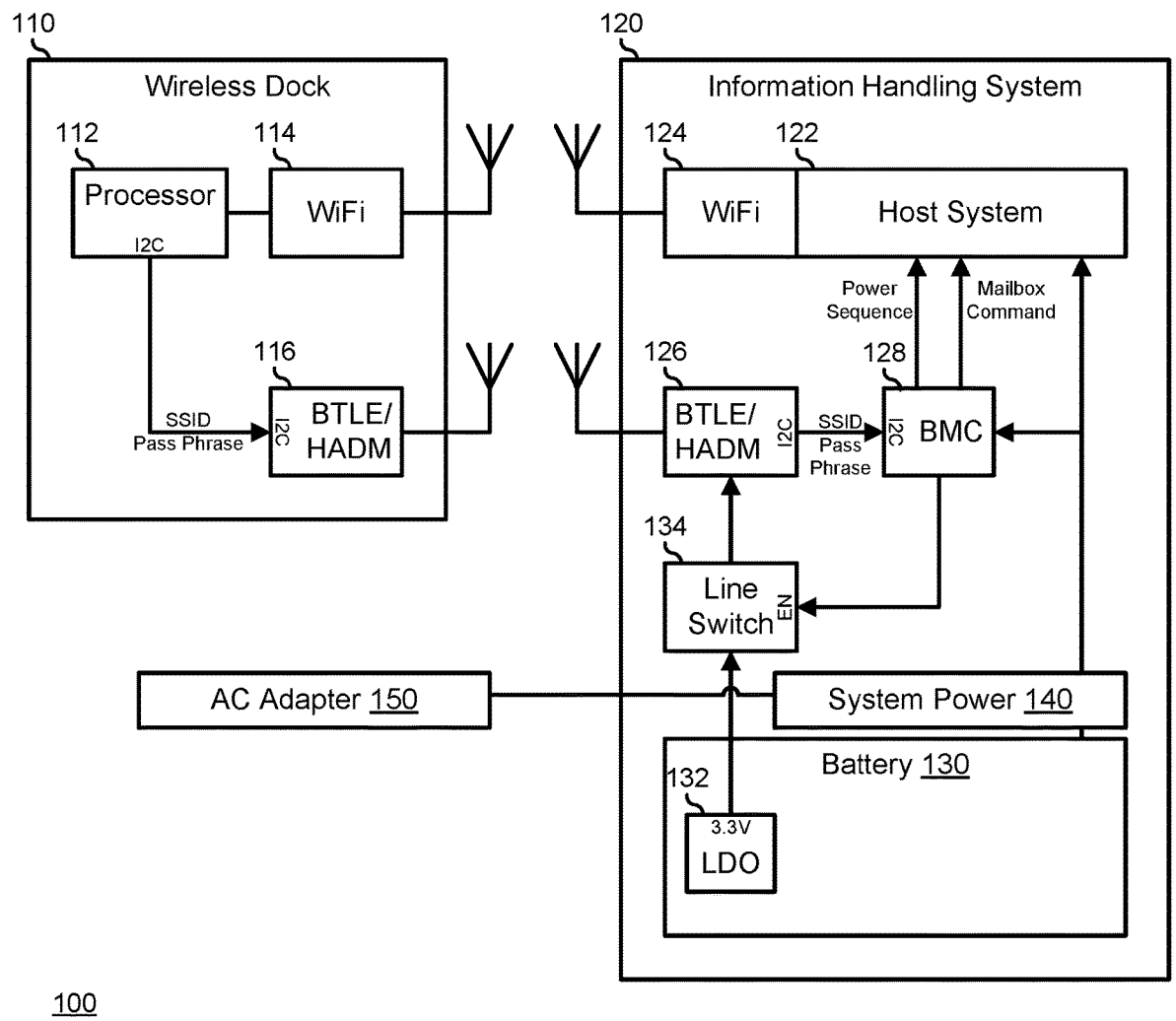
FIG. 1 is a block diagram of a system for providing wireless networking according to an embodiment of the current disclosure.

FIG. 1 illustrates a wireless environment 100 including a wireless dock 110, an information handling system 120, and an AC power adaptor 150. Wireless environment 100 may be an office and include additional elements such as one or more video display device, a camera/video device, a high-capacity data storage device, one or more human interface devices (HIDs) such as a keyboard, a mouse, or the like, a wireless router or other network device to provide an Internet connection, a charging device for wireless environment 100, and the like. Wireless dock 110 provides a hub for the interconnectivity between wireless environment 100 and the other elements of wireless environment 100. Information handling system 120 represents a mobile processing device, such as a laptop computer system, a notebook device, a cellular telephone or tablet device, or the like, and is characterized by the fact that the information handling system may be removed from wireless environment 100 for use in other locations.

Wireless dock 110 and information handling system 120 are each configured to recognize the presence of the other, and to automatically establish a wireless data connection between the wireless dock and the information handling system when they are brought into proximity to each other. In particular, wireless dock 110 broadcasts a service set identifier (SSID) that identifies a wireless network associated with the wireless dock and information handling system 120 detects the wireless network and provides a pass phrase to securely connect to the wireless network. In this way, the user of wireless environment 100 gains the full feature set of the wireless environment when the user brings information handling system 120 into the location of the wireless environment. For example, the user may access richer visual content via one or more monitors that are typically larger than the display device of the information handling system, deeper data storage capacity, more usable or ergonomic HIDs, greater Internet access, battery charging, or the like when the information handling system is docked to wireless dock 110. Note that the establishment of wireless data communication links and the protocols therefore are known in the art and will not be further described herein, except as needed to illustrate the current embodiments.

Wireless dock 110 includes a processor 112, a wireless data communication interface (WiFi) module 114, and a bluetooth low energy (BTLE)/high accuracy distance measurement (HADM) module 116. Information handling system 120 includes a host system 122, a WiFi module 124, a BTLE/HADM module 126, a baseboard management controller (BMC) 128, a battery 130 that includes a low-drop out (LDO) module 132, a line switch 134, and a system power module 140. As noted above, wireless dock 110 provides a hub for the interconnectivity between wireless environment 100 and the other elements of wireless environment 100. In this regard, processor 112 is not necessarily to be understood as a general purpose processor, but may be understood a controller that orchestrates the activities of wireless dock 110 in providing said interconnectivity, and WiFi module 114 provides the main data communication link between the wireless dock and information handling system 120. Note that as illustrated, BTLE and WiFi wireless data communication interface and wireless data communication links are utilized, but other types of data communication interfaces may be utilized as needed or desired. Note further that as illustrated, HADM is utilized for distance measurement, but other distance measurement mechanisms may be utilized, such as Ultra-Wide Band (UWB) positioning, radar, lidar, or the like, as needed or desired.

In particular, in docked operation, WiFi module 114 establishes a wireless data communication link with WiFi module 124 for the transfer of data between information handling system 120 and wireless dock 110. For example, the data transmitted via the wireless data communication link may include video content from information handling system 120 that is interconnected by processor 112 to the one or more monitors connected to the wireless dock, Internet content including requests from the information handling system that are interconnected by the processor to the Internet connection and responses that are routed back to the information handling system, data transfers between the information handling system and a mass storage device connected to the wireless dock, and the like. The operation of BTLE/HADM modules 116 and 126 will be described further below.

In information handling system 120, host system 122 and WiFi module 124 are illustrated as being joined together. This is to illustrate that host system 122 and WiFi module 124 are typically tightly integrated together. For example, host system 122 and WiFi module 124 may be integrated into a common System-on-a-Chip (SoC) that share a common power domain from battery 130, or may be provided based upon a common interface. For example, WiFi module 124 may represent a combined WiFi/Bluetooth module that provides wireless local area network (WLAN) connectivity. The WiFi/Bluetooth module may be connected to host system 122 via a PCIe/USB interface, an Intel Connectivity Integration (CNVi) interface, or the like. In either case, the pairing of host system 122 and WiFi module 124 is typically architecturally limited such that the WiFi module is non-functional without power being supplied to the host system. Host system 122 represents the elements of information handling system 120 that provide the processing environment of the information handling system, and may include other elements, such as one or more processor, memory devices, data storage devices, HIDs, and the like. In this regard, WiFi module 124 may be understood to be connected to any suitable component of host system 122, such as to a processor, a peripheral control hub (PCH), or the like as needed or desired.

Because of this architectural limitation, the external module can not function without its back end turned on. Hence when information handling system 120 is in hibernate or shut down (G3) state, WLAN/BT will not function. However, wireless dock 110 and information handling system 120 rely on the distance detection functionality of WiFi modules 114 and 124 (for example received signal strength indication (RSSI) functionality) to determine when the information handling system is located proximate to the wireless dock. Typically, information handling system 120 will establish the wireless data communication link when the information handling system is within a half a meter from wireless dock. Thus, when information handling system 120 is in hibernate or shut down (G3) state, the information handling system will not automatically establish the wireless data communication link, regardless of the distance from wireless dock 110.

Thus the typical information handling system will not enter the hibernate or shut down (G3) state, but will enter the adaptive connected standby (ACS) state/modern standby (MS) state. The information handling system maintains power to the host system and the WiFi module in order to retain the automatic establishment of the wireless data communication link. However when an information handling system is maintained in the ACS/MS state, there is a constant power drain from the battery of the information handling system. For example an information handling system with a fresh factory image may consume about 200~300 mW in the ACS/MS state, and may consume over ten (10) W with a typical corporate image installed. To mitigate this, Microsoft introduced adaptive hibernation which transitions the information handling system from ACS/MS state to the hibernate state when the system drains more than a predetermined amount (typically 5%) of the battery since entering ACS/MS. This ensures user will only see a small battery charge level change upon resume. Again, when the information handling system is in the hibernate state, the information handling system will not automatically establish the wireless data communication link with the wireless dock.

Another issue with the typical information handling system is the "hot bag" syndrome, where the information handling system unintentionally wakes from the ACS/MS state in response to an input from a Bluetooth HID. For example, a Bluetooth mouse that is carried along with an information handling system may be jostled and provide a HID input to the information handling system, and thereby wake the information handling system to a full power mode, resulting in the heating of the carrying case (that is a "hot bag"). To mitigate this, a knob has been introduced called Input Suppression that prevents Bluetooth HID devices from waking the information handling system when in ACS/MS with the lid closed and system on DC power. However, the typical wireless dock may mimic a Bluetooth keyboard to send a wake event to the information handling system. Thus, for the wireless dock to wake the information handling system, it is necessary to disable Input Suppression, thereby undoing the mitigation to prevent the "hot bag" issue.

In a particular embodiment, BTLE/HADM module 126 is powered by LDO module 132 via line switch 134. LDO module 132 provides a 3.3 V power rail directly from battery 130. Battery 130 represents a power management system of information handling system 120 that may include a battery for DC operation, an AC power converter, a battery management unit (BMU), and other elements to monitor, manage, and maintain the power state of the information handling system, as needed or desired. As such, LDO module 132 is enabled to provide the 3.3 V power rail when information handling system 120 is in the hibernate or shut down (G3) state, thereby providing power to BTLE/HADM module 126 in the hibernate and shut down (G3) states. In another case, LDO module 132 provides a constant 3.3 V power rail, and BMC 128 operates to enable line switch 134 to provide the 3.3 V power rail to BT in the hibernate and shut down (G3) states. BTLE/HADM modules 116 and 126 represent low-power devices (for example less than 50 mW) that, particularly in the case of BTLE/HADM module 126, do not excessively drain the battery of information handling system 120 in the hibernate and shut down (G3) states.

In the current embodiment, information handling system 120 does not depend on the detection of the proximity of information handling system 120 to wireless dock 110 by the RSSI mechanism employed by WiFi modules 114 and 124 when the information handling system is in the hibernate or shut down (G3) states. Rather, BTLE/HADM modules 116 and 126 rely on the HADM function to determine when information handling system 120 is located proximate to wireless dock 110. BTLE/HADM modules 116 and 126 establish a pre-boot wireless data communication link between wireless dock 110 and information handling system 120 based upon previously established credentials or upon credentials provided in association with a first-time connection of the information handling system to the wireless dock, as described further below.

When the pre-boot wireless data communication link is established between BTLE/HADM modules 116 and 126, BTLE/HADM module 126 issues a wake signal to BMC 128, and the BMC wakes information handling system 120 from the hibernate or shut down (G3) state. In a particular case, BTLE/HADM module 126 is not enumerated in an operating environment instantiated by host system 122 (for example a BIOS/UEFI). In this case, BTLE/HADM module 126 is not subject to the input suppression restriction, and the establishment of the pre-boot wireless data communication link will not result in a "hot bag" situation. Moreover, because BTLE/HADM module 126 is powered separately from the rest of information handling system 120, the information handling system may employ the Adaptive Hibernate function without impacting the operation of the BTLE/HADM module. Also, because BTLE/HADM module 126 is not enumerated in the operating environment, the wireless data communication link may be deemed to be more secure for a pre-boot environment than a wireless data communication link established between WiFi module 114 and WiFi module 124.

Figure 2:
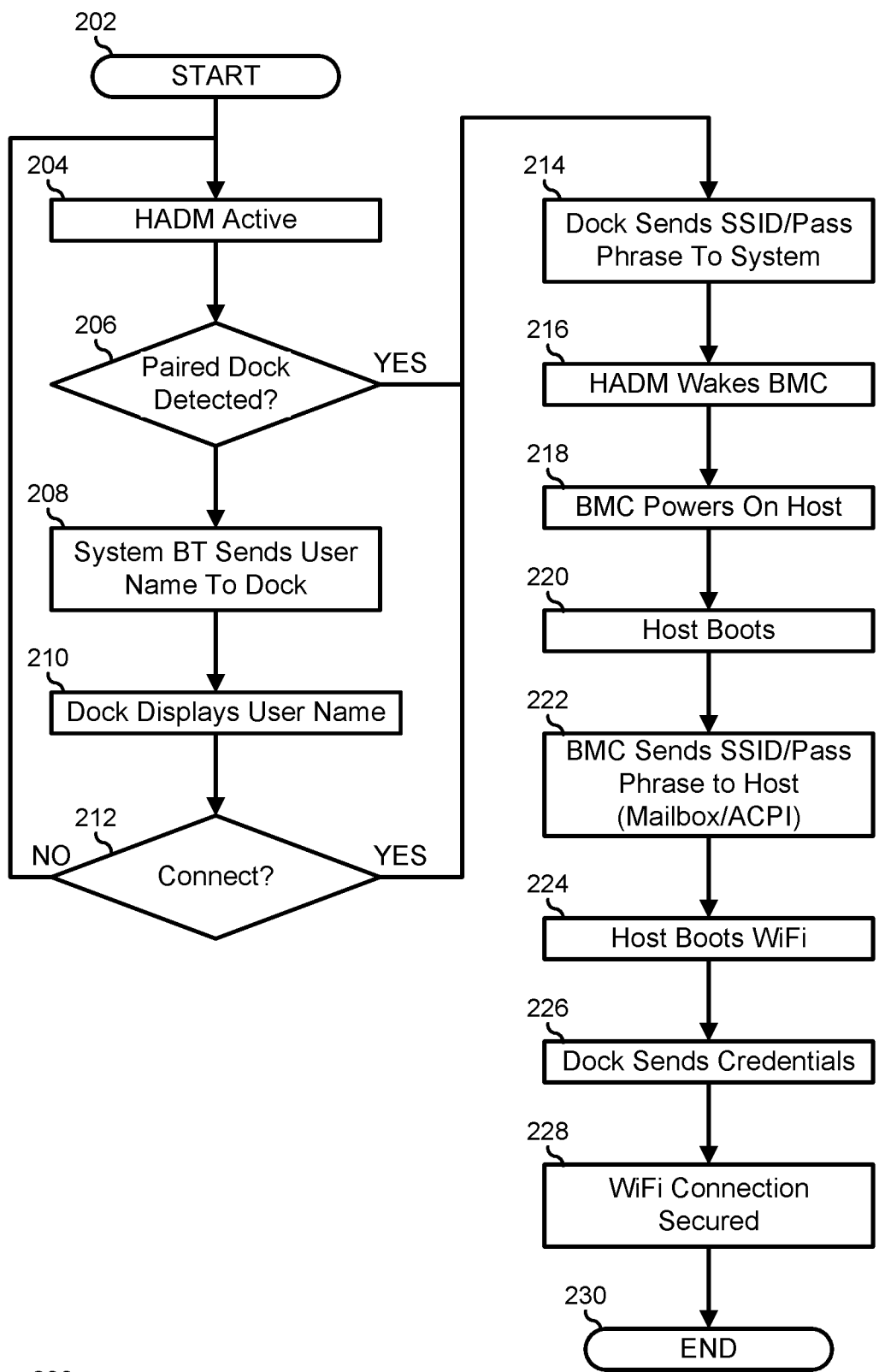
FIG. 2 is a flowchart illustrating a method for ultra-low power ranging and PC wake for wireless docking applications according to an embodiment of the current disclosure.

FIG. 2 illustrates a method 200 for ultra-low power ranging and PC wake for wireless docking applications, starting at block 202. The HADM functions of BTLE/HADM modules of a wireless dock and an information handling system are activated in block 204 because they are directly connected to a battery. When the HADM functions of the BTLE/HADM modules detect the presence of each other within a predetermined distance (for example within half a meter), a decision is made as to whether or not the associated wireless dock and information handling system have been previously paired in decision block 206. If so, the "YES" branch of decision block 206 is taken and the method proceeds to block 214 as described further below. If the wireless dock and information handling system have not been previously paired, the "NO" branch of decision block 206 is taken and the information handling system sends a user name to the wireless dock in block 208. The wireless dock displays the user name in block 210, and a user may opt to connect the wireless dock to the information handling system and make a selection to make the connection as needed or desired. A decision is made as to whether or not the user has opted to connect the wireless dock to the information handling system in decision block 212. If not, the "NO" branch of decision block 212 is taken and the method returns to block 204 where the HADM functions are activated. If the user has opted to connect the wireless dock to the information handling system, the "YES" branch of decision block 212 is taken and the method proceeds to block 214 as described further below.

When either the wireless dock and information handling system have been previously paired and the "YES" branch of decision block 206 is taken, or the user has opted to connect the wireless dock to the information handling system and the "YES" branch of decision block 212 is taken, the wireless dock sends a SSID/pass phrase to the information handling system via the pre-boot wireless data communication link in block 214. The BTLE?HADM module of the information handling system sends a wake signal to a BMC of the information handling system in block 216, and the BMC powers on the host system in block 218. The host system boots in block 220 and the BMC sends the SSID/pass phrase received from the wireless dock to the host system in block 222. The host system boots the WiFi module of the information handling system and the WiFi module establishes a wireless data communication link with the wireless dock in block 224. The wireless dock sends credentials to the information handling system in block 226, the wireless data communication link is secured in block 228, and the method ends in block 230.

Figure 3:
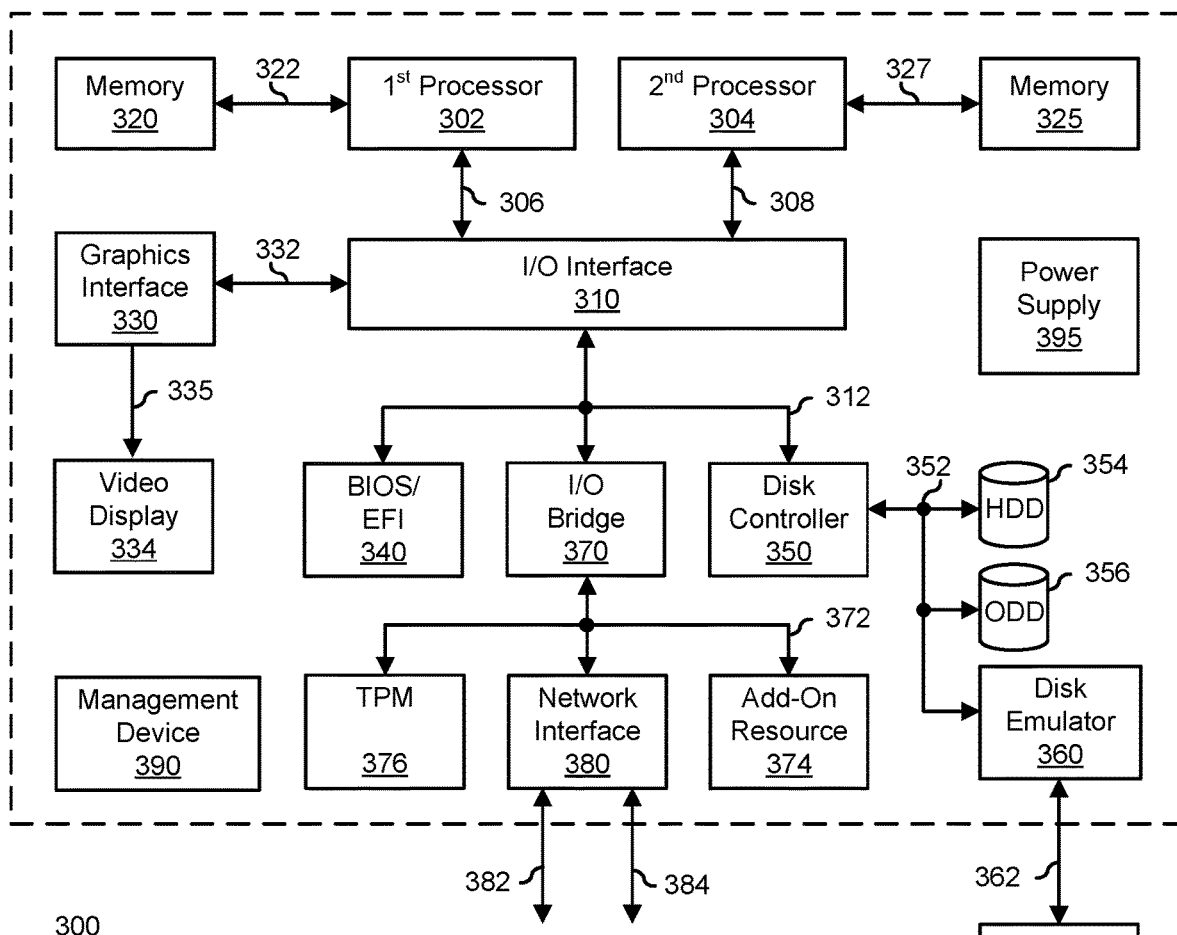
FIG. 3 is a block diagram illustrating a generalized information handling system according to another embodiment of the present disclosure.

FIG. 3 illustrates a generalized embodiment of an information handling system 300. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 300 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 300 can include processing resources for executing machine-executable code, such as a central processing unit (CPU), a programmable logic array (PLA), an embedded device such as a System-on-a-Chip (SoC), or other control logic hardware. Information handling system 300 can also include one or more computer-readable medium for storing machine-executable code, such as software or data. Additional components of information handling system 300 can include one or more storage devices that can store machine-executable code, one or more communications ports for communicating with external devices, and various input and output (I/O) devices, such as a keyboard, a mouse, and a video display. Information handling system 300 can also include one or more buses operable to transmit information between the various hardware components.

Information handling system 300 can include devices or modules that embody one or more of the devices or modules described below, and operates to perform one or more of the methods described below. Information handling system 300 includes processors 302 and 304, an input/output (I/O) interface 310, memories 320 and 325, a graphics interface 330, a basic input and output system/universal extensible firmware interface (BIOS/UEFI) module 340, a disk controller 350, a hard disk drive (HDD) 354, an optical disk drive (ODD) 356, a disk emulator 360 connected to an external solid state drive (SSD) 362, an I/O bridge 370, one or more add-on resources 374, a trusted platform module (TPM) 376, a network interface 380, a management device 390, and a power supply 395. Processors 302 and 304, I/O interface 310, memory 320 and 325, graphics interface 330, BIOS/UEFI module 340, disk controller 350, HDD 354, ODD 356, disk emulator 360, SSD 362, I/O bridge 370, add-on resources 374, TPM 376, and network interface 380 operate together to provide a host environment of information handling system 300 that operates to provide the data processing functionality of the information handling system. The host environment operates to execute machine-executable code, including platform BIOS/UEFI code, device firmware, operating system code, applications, programs, and the like, to perform the data processing tasks associated with information handling system 300.

In the host environment, processor 302 is connected to I/O interface 310 via processor interface 306, and processor 304 is connected to the I/O interface via processor interface 308. Memory 320 is connected to processor 302 via a memory interface 322. Memory 325 is connected to processor 304 via a memory interface 327. Graphics interface 330 is connected to I/O interface 310 via a graphics interface 332, and provides a video display output 335 to a video display 334. In a particular embodiment, information handling system 300 includes separate memories that are dedicated to each of processors 302 and 304 via separate memory interfaces. An example of memories 320 and 325 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 340, disk controller 350, and I/O bridge 370 are connected to I/O interface 310 via an I/O channel 312. An example of I/O channel 312 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 310 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. BIOS/UEFI module 340 includes BIOS/UEFI code operable to detect resources within information handling system 300, to provide drivers for the resources, initialize the resources, and access the resources. BIOS/UEFI module 340 includes code that operates to detect resources within information handling system 300, to provide drivers for the resources, to initialize the resources, and to access the resources.

Disk controller 350 includes a disk interface 352 that connects the disk controller to HDD 354, to ODD 356, and to disk emulator 360. An example of disk interface 352 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 360 permits SSD 364 to be connected to information handling system 300 via an external interface 362. An example of external interface 362 includes a USB interface, an IEEE 1394 (Firewire) interface, a proprietary interface, or a combination thereof. Alternatively, solid-state drive 364 can be disposed within information handling system 300.

I/O bridge 370 includes a peripheral interface 372 that connects the I/O bridge to add-on resource 374, to TPM 376, and to network interface 380. Peripheral interface 372 can be the same type of interface as I/O channel 312, or can be a different type of interface. As such, I/O bridge 370 extends the capacity of I/O channel 312 when peripheral interface 372 and the I/O channel are of the same type, and the I/O bridge translates information from a format suitable to the I/O channel to a format suitable to the peripheral channel 372 when they are of a different type. Add-on resource 374 can include a data storage system, an additional graphics interface, a network interface card (NIC), a sound/video processing card, another add-on resource, or a combination thereof. Add-on resource 374 can be on a main circuit board, on a separate circuit board or add-in card disposed within information handling system 300, a device that is external to the information handling system, or a combination thereof.

Network interface 380 represents a NIC disposed within information handling system 300, on a main circuit board of the information handling system, integrated onto another component such as I/O interface 310, in another suitable location, or a combination thereof. Network interface device 380 includes network channels 382 and 384 that provide interfaces to devices that are external to information handling system 300. In a particular embodiment, network channels 382 and 384 are of a different type than peripheral channel 372 and network interface 380 translates information from a format suitable to the peripheral channel to a format suitable to external devices. An example of network channels 382 and 384 includes InfiniBand channels, Fibre Channel channels, Gigabit Ethernet channels, proprietary channel architectures, or a combination thereof. Network channels 382 and 384 can be connected to external network resources (not illustrated). The network resource can include another information handling system, a data storage system, another network, a grid management system, another suitable resource, or a combination thereof.

Management device 390 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 300. In particular, management device 390 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 300, such as system cooling fans and power supplies. Management device 390 can include a network connection to an external management system, and the management device can communicate with the management system to report status information for information handling system 300, to receive BIOS/UEFI or system firmware updates, or to perform other task for managing and controlling the operation of information handling system 300. Management device 390 can operate off of a separate power plane from the components of the host environment so that the management device receives power to manage information handling system 300 when the information handling system is otherwise shut down. An example of management device 390 includes a commercially available BMC product or other device that operates in accordance with an Intelligent Platform Management Initiative (IPMI) specification, a Web Services Management (WS-Man) interface, a Redfish Application Programming Interface (API), another Distributed Management Task Force (DMTF), or other management standard, and can include an Integrated Dell Remote Access Controller (iDRAC), an Embedded Controller (EC), or the like. Management device 390 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising: a baseboard management controller; a first wireless data communication interface powered by a first power rail; a processor powered by a second power rail; and a second wireless data communication interface powered by the second power rail; wherein when the second power rail is powered off: the first power rail is powered on; the first wireless communication interface is configured to determine that the information handling system is within a predetermined distance from a wireless dock, and in response to establish a first wireless data communication link with the wireless dock, and to provide an indication to wake the processor and the second wireless data communication interface; and in response to the indication, the baseboard management controller is configured to power on the second power rail, to wake the processor, and to establish a second wireless data communication link between the second wireless data communication interface and the wireless dock.

2. The information handling system of claim 1, wherein, in response to the indication, the information handling system is further configured to power off the first power rail.

3. The information handling system of claim 1, wherein, in response to the indication, the baseboard management controller is further configured to power on the second power rail.

4. The information handling system of claim 1, further comprising a line switch to switch the first power rail.

5. The information handling system of claim 4, wherein in response to the indication, the baseboard management controller is further configured to direct the line switch to power off the first power rail.

6. The information handling system of claim 3, wherein, in response to the indication, the baseboard management controller is further configured to wake the processor.

7. The information handling system of claim 1, wherein the first wireless data communication interface is a Bluetooth Low Energy interface.

8. The information handling system of claim 7, wherein further, the Bluetooth Low Energy interface is configured to provide a high accuracy distance measurement.

9. The information handling system of claim 8, wherein, in determining that the information handling system is within the predetermined distance, the first wireless data communication interface utilizes the high accuracy distance measurement.

10. A method, comprising: powering a first wireless data communication interface of an information handling system by a first power rail; powering a processor of the information handling system by a second power rail; powering a second wireless data communication interface of the information handling system by the second power rail; powering the first power rail on when the second power rail is powered off; determining, by the first wireless data communication interface, that the information handling system is within a predetermined distance from a wireless dock; establishing a first wireless data communication link between the first wireless data communication interface and the wireless dock in response to determining that the information handling system is within the predetermined distance; providing an indication in response to establishing the first wireless data communication link; and receiving, by a baseboard management controller of the information handling system, the indication: in response to the indication: powering on, by the baseboard management controller, the second power rail; waking the processor; and establishing a second wireless data communication link between the second wireless data communication interface and the wireless dock.

11. The method of claim 10, wherein in response to the indication, the method further comprises powering off the first power rail.

12. The method of claim 10, wherein, in response to the indication, the method further comprises powering on the second power rail by the baseboard management controller.

13. The method of claim 10, further comprising coupling the first power rail to a battery via a line switch.

14. The method of claim 13, wherein, in response to the indication, the method further comprises directing, by the baseboard management controller, the line switch to power off the first power rail.

15. The information handling system of claim 3, wherein, in response to the indication, the baseboard management controller is further configured to wake the processor.

16. The method of claim 10, wherein the first wireless data communication interface is a Bluetooth Low Energy interface.

17. The method of claim 16, wherein the Bluetooth Low Energy interface is configured to provide a high accuracy distance measurement, and wherein the method further comprises:
   determining that the information handling system is within the predetermined distance, the first wireless data communication interface utilizes the high accuracy distance measurement.

18. An information handling system, comprising:
   a baseboard management controller;
   a battery configured to provide a first power rail and a second power rail;

a first wireless data communication interface powered by the first power rail;

a processor powered by the second power rail; and a second wireless data communication interface powered by the second power rail;

wherein when the second power rail is powered off:

the first power rail is powered on;

the first wireless data communication interface is configured to determine that the information handling system is within a predetermined distance from a wireless dock, and in response to establish a first wireless data communication link with the wireless dock, and to provide an indication to wake the processor and the second wireless data communication interface; and in response to the indication, the baseboard management controller is configured to power on the second power rail, to wake the processor, and to establish a second wireless data communication link between the second wireless data communication interface and the wireless dock.

* * * * *